US007070209B2

(12) United States Patent  (10) Patent No.: US 7,070,209 B2
Collins  (45) Date of Patent: Jul. 4, 2006

(54) TAPPING SLEEVE (75) Inventor: Aaron Caldwell Najera Collins, Texarkana, TX (US)

(73) Assignee: JCM Industries, Inc., Nash, TX (US)

( * ) Notice: Subject to any disclaimer, the term of this patent is extended or adjusted under 35 U.S.C. 154(b) by 0 days.

(21) Appl. No.: 10/700,242

(22) Filed: Nov. 3, 2003

(65) Prior Publication Data

US 2005/0093299 A1  May 5, 2005

(51) Int. Cl.
 *F16L 19/00* (2006.01)
(52) U.S. Cl. .................. 285/373; 285/197; 285/133.21; 285/133.3
(58) Field of Classification Search ................. 285/373, 285/197, 198, 199, 133.11, 133.21, 133.3
 See application file for complete search history.

(56) References Cited

U.S. PATENT DOCUMENTS

| | | | | |
|---|---|---|---|---|
| 873,689 | A | * | 12/1907 | Winkle ........................ 285/197 |
| 1,570,887 | A | | 1/1926 | Graves |
| 2,901,271 | A | * | 8/1959 | Zoldak ................. 285/133.21 |
| 3,360,284 | A | | 12/1967 | Ver Nooy |
| 3,362,730 | A | * | 1/1968 | St. Clair et al. ............. 285/197 |
| 3,807,435 | A | | 4/1974 | Fenster et al. |
| 4,097,073 | A | | 6/1978 | Van Houtte |
| 4,158,461 | A | | 6/1979 | Francis |
| 4,391,458 | A | * | 7/1983 | Blakeley ..................... 285/373 |
| 5,553,898 | A | | 9/1996 | Rogers, Jr. |
| 6,131,957 | A | * | 10/2000 | Saito et al. ............ 285/133.21 |
| 6,412,824 | B1 | | 7/2002 | Kunsman |

OTHER PUBLICATIONS

PowerSeal Pipeline Products Corporation, Catalog for 3490MJ PowerMJ Stainless Steel Tapping Sleeve, date unknown, pp. 1-4.
Cascade Waterworks Mfg. Catalog for Pressure Rated Tapping Sleeves, May 1999, pp. 1-8.
Smith-Blair web site, Tapping Sleeves, www.smith-blair.com, date unknown, pp. 1-5.

(Continued)

*Primary Examiner*—David Bochna
(74) *Attorney, Agent, or Firm*—Thompson & Knight LLP; James J. Murphy; Max Ciccarelli (57) ABSTRACT

An improved tapping sleeve includes a first sleeve member having an outlet aperture, a second sleeve member, and a unitary gasket. An outlet retaining ring is positioned around the outlet aperture. A pair of end retaining lips are positioned on inner surfaces of the first and second sleeve members at opposing ends of the sleeve members. The gasket includes a gasket outlet having a pair of tapered surfaces on opposing longitudinal sides of the gasket outlet. The gasket, when positioned on a pipe in an un-stretched, uncompressed position subtends an arc of less than 360 degrees, creating a gap in the gasket. As the first and second sleeve members are connected, the outlet retaining lip engages armor members on the gasket, thereby circumferentially stretching the gasket and closing the gap. The tapered surfaces and the outlet retaining lip prevent excessive gasket flow into the outlet aperture.

30 Claims, 5 Drawing Sheets

OTHER PUBLICATIONS

Smith-Blair, Catalog on Clamp and Coupling Products, date unknown, pp. 5-8.

Cascade Waterworks Mfg., Catalog on Stainless Steel "Total Seal" Pressure Rated Tapping Sleeves, date unknown, pp. 1-2.

PowerSeal Pipeline Products Corporation, Specification sheet for Model 3460 Tapping Sleeves, Oct. 15, 1996, 1 page.

Cascade Waterworks Mfg., Specification Sheets for CST Tapping Sleeves, date unknown, pp. 1-4.

* cited by examiner

TAPPING SLEEVE

BACKGROUND OF THE INVENTION

1. Field of the Invention

This invention relates generally to pipe accessories and more particularly to a tapping sleeve that allows an existing pipe to be tapped and provides a sealed outlet for attaching a branch line.

2. Description of Related Art

Water, gas, and other fluid pipelines are used to deliver fluids from one location to another. Many times these pipelines are buried, but they may also be located above ground. The pressure of the fluid within the pipe will vary depending on the type of fluid and the size of the pipe, but it is possible to have relatively high pressures. It is a very common need to expand pipelines by adding branch lines to divert fluids carried by the pipeline to new locations. Similarly, if an existing branch becomes corroded, it may be necessary to replace the branch by tapping into the pipeline at a new location.

Tapping sleeves are devices that allow in-service tapping of a pipeline. A tapping sleeve is installed around a pipe, a branch line is attached to the tapping sleeve, and a hole is tapped in the pipe. By using a tapping sleeve, the branch line can be attached without having to de-pressurize and clear the pipeline. The tapping sleeve typically includes a pair of sleeve members and a sealing device that are attachable around the pipe.

Tapping sleeves are manufactured in many different shapes and sizes. Some existing tapping sleeves use gaskets or o-rings to locally seal around the hole that is being tapped in the pipeline. While these sealing rings may work fine in pristine laboratory conditions, they are more difficult to properly install under the often rugged conditions experienced by persons working on a pipeline. Sometimes the pipes to be tapped are located underground, and dirt and other contaminants could interfere with the proper sealing of these devices. Typically o-rings and gaskets installed locally around the tapped hole have relatively small surface areas that actually contact the pipe. These small surface areas decrease the likelihood of an effective seal when dirt and other contaminants are introduced. Another problem with these gaskets is that they fail to electrically insulate the sleeve members from the pipe, which may be a requirement when tapping pipelines carrying certain fluids.

Other existing tapping sleeves use larger, "full circle" gaskets that cover the entire outer surface of the pipe underneath the sleeve members. These gaskets are typically split into two sections. One section of the gasket is glued to the inner wall of a first sleeve member, while another section is glued to the inner wall of a second sleeve member. The gasket on one of the sleeve members usually includes one or more small pieces of armor that bridge the gap between the two sleeve members as the sleeve members are attached around the pipe. The gaskets are glued to the sleeve members to prevent "flow" of the gasket. If the gaskets were not glued, the gasket could potentially slide out of the end of the sleeve members, which would cause a loss of bolt torque on the tapping sleeve, and would likely breach the seal surrounding the tapped hole. One problem with glueing full-circle gaskets to the sleeve members of the tapping sleeve is that the gasket cannot be easily interchanged. It may be desirable to use a different size gasket for different pipe sizes while using the same sleeve members. It may also be desirable to use a gasket made of a different material depending on the type of fluid being carried by the pipe.

A need therefore exits for an improved tapping sleeve having a gasket that fully insulates the sleeve members of the tapping sleeve from the pipe. A need further exists for a gasket that is easily replaceable or interchangeable with the sleeve members and is not bonded to the sleeve members. Since the gasket should not be permanently bonded to the sleeve members, a need exists for controlling the flow of the gasket material as the sleeve members are tightened around the gasket and the gasket is compressed. More specifically, a need exists for preventing the gasket material from blocking the tapped hole in the pipe.

BRIEF SUMMARY OF THE INVENTION

The problems presented by traditional tapping sleeves are solved by the present invention. A tapping sleeve having a first sleeve member, a second sleeve member, and a gasket is provided. The first sleeve member includes an outlet aperture, and the gasket includes a gasket outlet. The gasket outlet includes a pair of tapered surfaces on opposing longitudinal sides of the gasket outlet.

The gasket is placed around a pipe such that the gasket outlet is aligned with an area of the pipe to be tapped. The first and second sleeve members are then placed around the gasket such that the outlet aperture is aligned with the gasket outlet. The first and second sleeve members are then securely attached to one another, which compresses and stretches the gasket between the sleeve members and the pipe. The tapered surfaces of the gasket outlet prevent excessive flowing of the gasket material into the outlet aperture while the gasket is under compression. This prevents the gasket from blocking any portion of the hole that is then tapped in the pipe.

The invention further provides a tapping sleeve having a first sleeve member that includes an outlet aperture and an outlet retaining lip disposed around the outlet aperture. The tapping sleeve also includes a second sleeve member and a gasket. The gasket includes a gasket wall having a gasket outlet, an inside surface, and an outside surface. The gasket wall subtends an arc less than 360 degrees when the gasket is placed on a pipe in an un-stretched, uncompressed position, which forms a gap in the gasket wall. An armor member is attached to the outside surface of the gasket and extends between the gasket outlet and the gap on opposing sides of the gasket. As the first and second sleeve members are positioned and tightened around the gasket on the pipe, the outlet retaining lip engages an edge of each armor member and exerts a force on the armor members, thereby circumferentially stretching the gasket around the pipe and closing the gap.

The invention further provides a first sleeve member having an outlet aperture, a second sleeve member, and a unitary gasket having a gasket outlet. An outlet retaining lip is disposed around the outlet aperture on an inner surface of the first sleeve member. A pair of end retaining lips are disposed on inner surfaces of the first and second sleeve members at both ends of the sleeve members. A substantially continuous annular depression is formed by the end retaining lips, the outlet retaining lip, and the inner surfaces of the first and second sleeve members. The unitary gasket is received by the annular depression when the first and second sleeve members are tightened around the gasket on the pipe.

Other objects, features, and advantages of the present invention will become apparent with reference to the drawings and detailed description that follow.

DETAILED DESCRIPTION OF THE PREFERRED EMBODIMENT

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical mechanical, structural, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
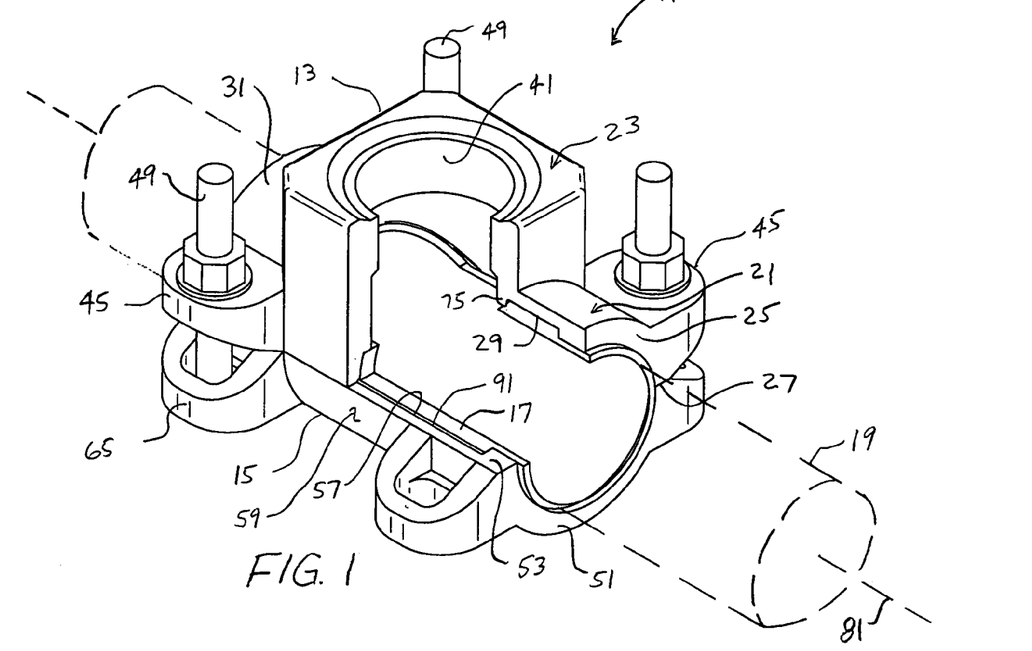
FIG. 1 depicts a perspective view of a tapping sleeve having a first sleeve member, a second sleeve member, and a gasket positioned on a pipe.
Figure 2:
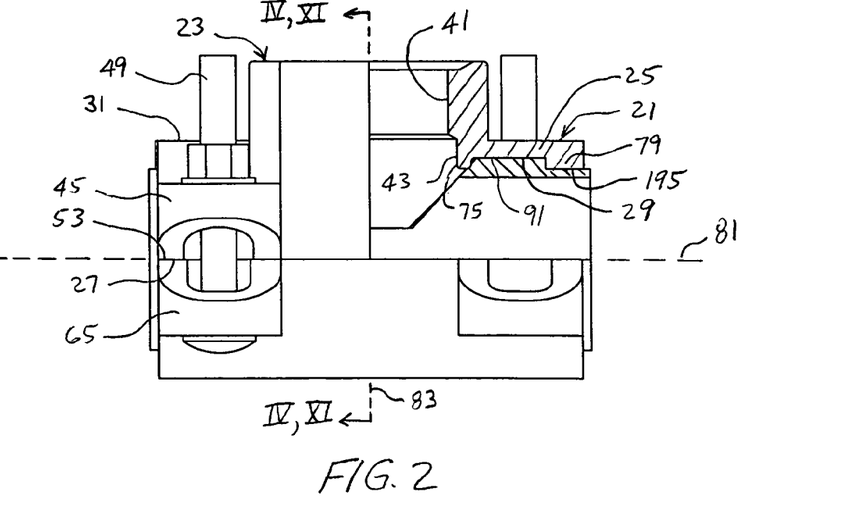
FIG. 2 illustrates a side view of the tapping sleeve of FIG. 1, along with a partial cross-sectional side view of the first sleeve member and the gasket.

Referring to FIGS. 1 and 2, a tapping sleeve 11 according to the present invention includes a first sleeve member 13, a second sleeve member 15, and a gasket 17. The tapping sleeve is used to tap an existing pipe 19 when a branch line is needed to be attached to the pipe 19. The tapping sleeve 11 of the present invention preferably allows a size-on-size tapping operation, which means that the tapping sleeve 11 can be used to install a branch line having an inner diameter as large as the inner diameter of the pipe 19. The tapping sleeve can also be sized to provide branch lines having smaller diameters than the pipe 19. The operation and installation of the tapping sleeve 11 will be explained in more detail below.

Figure 3:
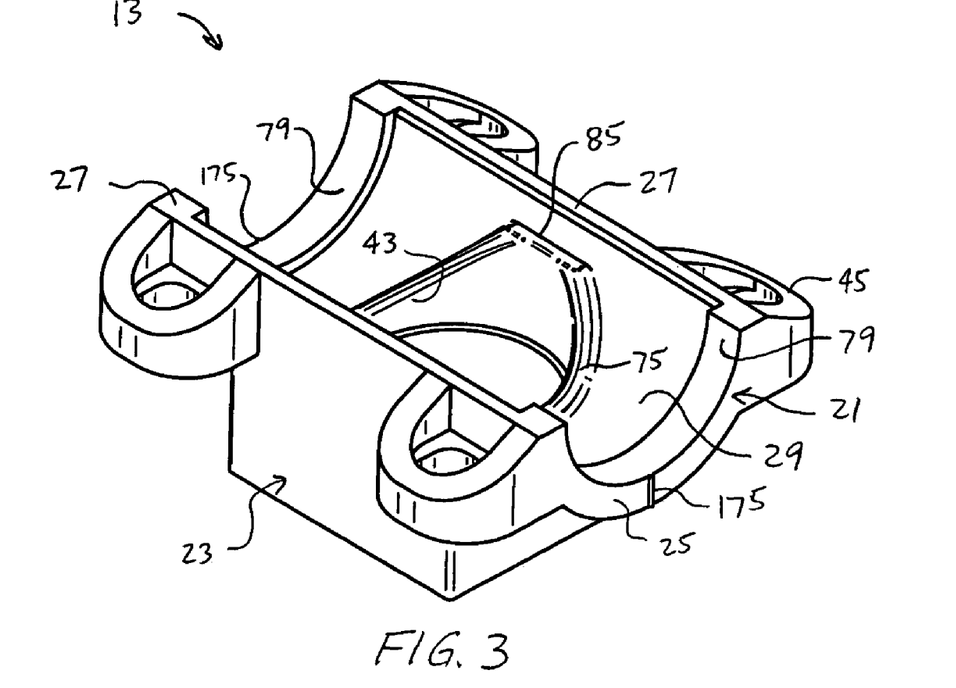
FIG. 3 depicts a bottom perspective view of the first sleeve member of FIG. 1.
Figure 4:
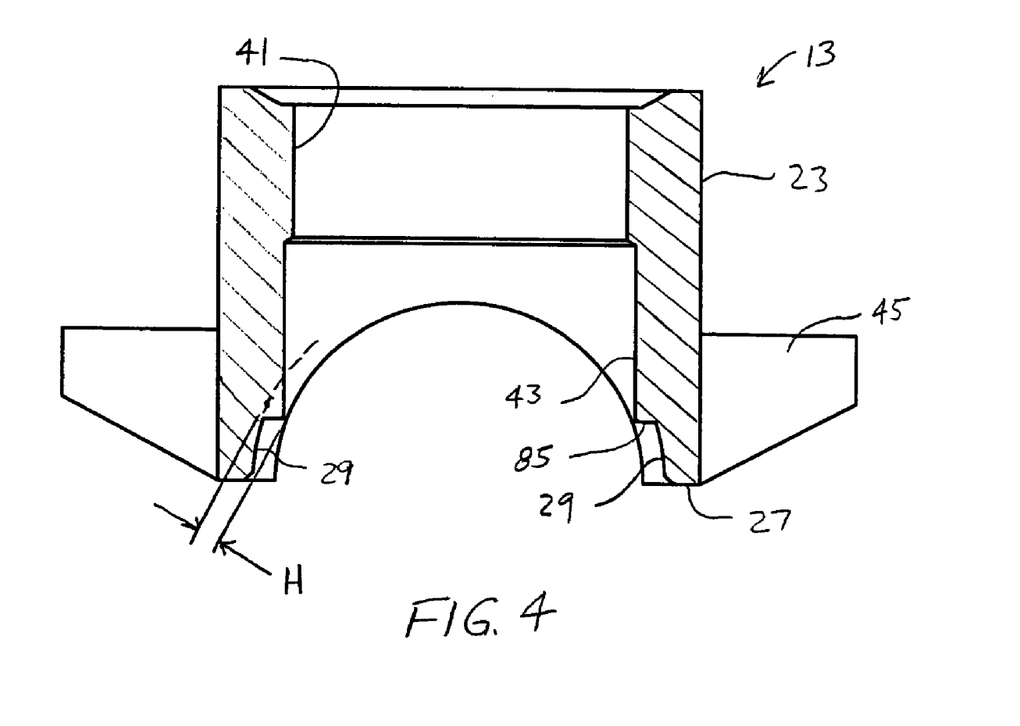
FIG. 4 illustrates a cross-sectional front view of the first sleeve member of FIG. 2 taken at IV—IV.

Referring still to FIGS. 1 and 2, and also to FIGS. 3 and 4, the first sleeve member 13 includes a mainline portion 21 and a branch portion 23, the mainline portion 21 having a substantially arcuate first sleeve wall 25 subtending an arc of approximately 180 degrees and terminating in a pair of first mating surfaces 27. The first sleeve wall 25 further includes an inner surface 29 and an outer surface 31. Branch portion 23 is integrally attached to the mainline portion 21 and includes a substantially cylindrical passage 41 that passes through the first sleeve wall 25 and forms an outlet aperture 43. A first plurality of lugs 45 are integrally attached to the first sleeve wall 25, and each lug 45 includes a bolt hole for receiving a bolt, or other fastener 49.

Second sleeve member 15 includes a substantially arcuate second sleeve wall 51 that subtends an arc of approximately 180 degrees and terminates in a pair of second mating surfaces 53. The second sleeve wall includes an inner surface 57 and an outer surface 59. A second plurality of lugs 65 is integrally attached to the second sleeve wall 51, and each lug 65 includes a bolt hole for receiving fastener 49. The bolt holes in the second plurality of lugs 65 are aligned with the bolt holes in the first plurality of lugs 45 when the first sleeve member 13 and the second sleeve member 15 are positioned and installed on the pipe 19.

A longitudinal axis 81 of the tapping sleeve 11 is illustrated in FIGS. 1 and 2. When the tapping sleeve is installed on the pipe 19, the longitudinal axis 81 of the tapping sleeve 11 is coaxial with the longitudinal axes of the pipe 19, the first sleeve member 13, the second sleeve member 15, and the gasket 17. For this reason, longitudinal axis 81, as used in the present disclosure, will represent the longitudinal axes of any of the following components: the tapping sleeve 11, the pipe 19, the first sleeve member 13, the second sleeve member 15, or the gasket 17.

Referring more specifically to FIG. 2, a midpoint of the tapping sleeve is located at that portion of the tapping sleeve 11 bisected by a midpoint plane 83. Midpoint plane 83 bisects the cylindrical passage 41 and is perpendicular to the longitudinal axis 81 of the tapping sleeve 11 as shown in FIG. 2. The midpoint plane 83 also designates an approximate midpoint of the first sleeve member 13, the second sleeve member 15, and the gasket 17 when the components of the tapping sleeve 11 are installed on the pipe 19.

An outlet retaining lip 75 is positioned on the inner surface 29 of the first sleeve member 13 such that the outlet retaining lip 75 surrounds the outlet aperture 43. The tapping sleeve 11 further includes a pair of end retaining lips 79 positioned at opposing ends of the first and second sleeve members 13, 15 on the inner surfaces 29, 57 of the first and second sleeve members 13, 15. A person of ordinary skill in the art of the present invention will recognize that each end retaining lip 79 is situated partially on first sleeve member 13 and partially on second sleeve member 15, but that each end retaining lip 79 is substantially continuous when the first and second sleeve members 13, 15 are attached around the pipe 19.

Outlet retaining lip 75 includes a pair of flat portions 85 positioned on opposing sides of the outlet retaining lip 75. The flat portions 85 are disposed in an area of the outlet retaining lip 75 nearest the first mating surfaces 27 of the first sleeve wall 25. Referring more specifically to FIG. 4, a cross-section of the first sleeve member 13 is illustrated at the midpoint of the first sleeve member. The outlet retaining lip 75 generally has a lip height, H, at the midpoint of the first sleeve member 13 equal to the radial distance that outlet retaining lip 75 extends from inner surface 29.

A substantially continuous annular depression 91 is formed by the end retaining lips 79, the outlet retaining lip 75, and the inner surfaces 29, 57 of the first and second sleeve members 13, 15. The annular depression 91 is capable of receiving the gasket 17 when the first and second sleeve members 13, 15 are installed around the gasket 17 on the pipe 19.

Referring to FIGS. 5–10, gasket 17 is preferably formed from a unitary gasket wall 101 having a central portion 103, a pair of stepped portions 105, an inside surface 109, and an outside surface 111. When placed on the pipe 19 in an un-stretched, uncompressed position (i.e. prior to installation of the first and second sleeve members 13, 15), the gasket wall 101 preferably subtends an arc less than 360 degrees, thereby creating a butt joint, or gap 115 in the gasket having a first gap surface 117 and a second gap surface 119. When placed in this position, the gasket shares a longitudinal axis with longitudinal axis 81 of the pipe.

Figure 5:
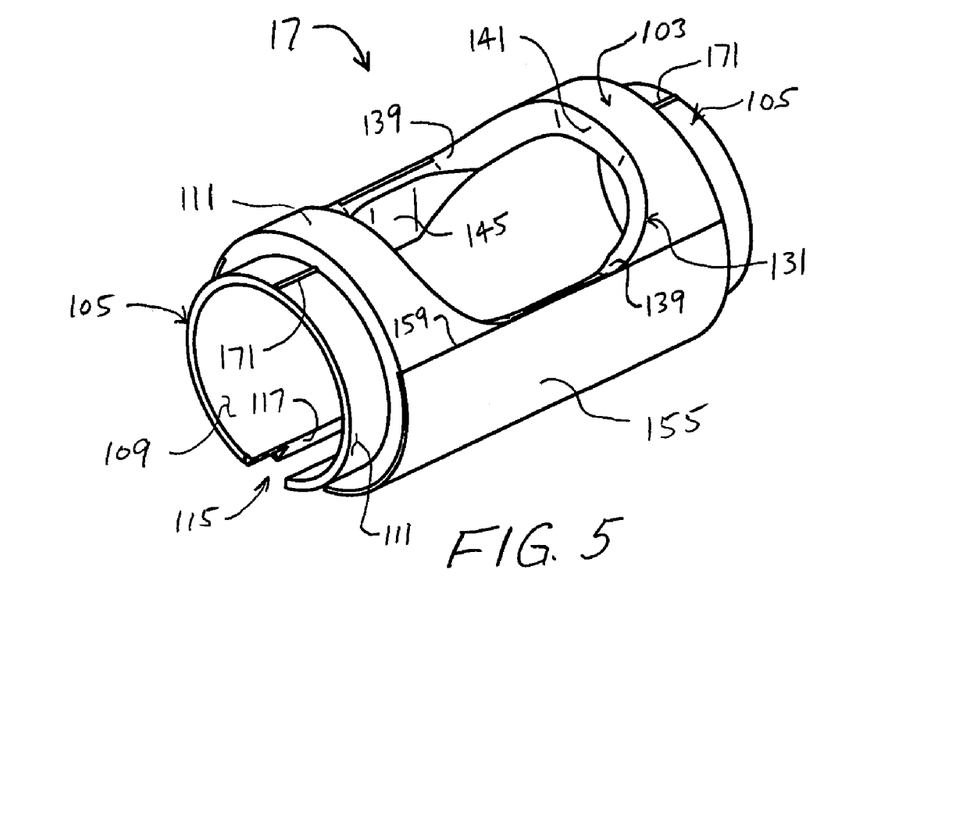
FIG. 5 depicts a perspective view of the gasket of FIG. 1.

A gasket outlet 131 is formed in the gasket wall 101 and includes a pair of longitudinal sides 133 and a pair of lateral sides 135. On each longitudinal side 133 of the gasket outlet 131, a longitudinal surface 139 is formed, and on each lateral side 135, a lateral surface 141 is formed. Each of the longitudinal surfaces 139 is spaced apart, and each of the lateral surfaces 141 is spaced apart. Each longitudinal surface 139 is integrally connected at one end to one of the lateral surfaces 141 and at another end to the other lateral surface 141. Preferably, each lateral surface 141 of the gasket 17 is contained in a plane that is substantially normal to the longitudinal axis 81 of the gasket. The longitudinal surfaces 139 are preferably angled inward toward each other as shown in FIGS. 5 and 6.

Figure 6:
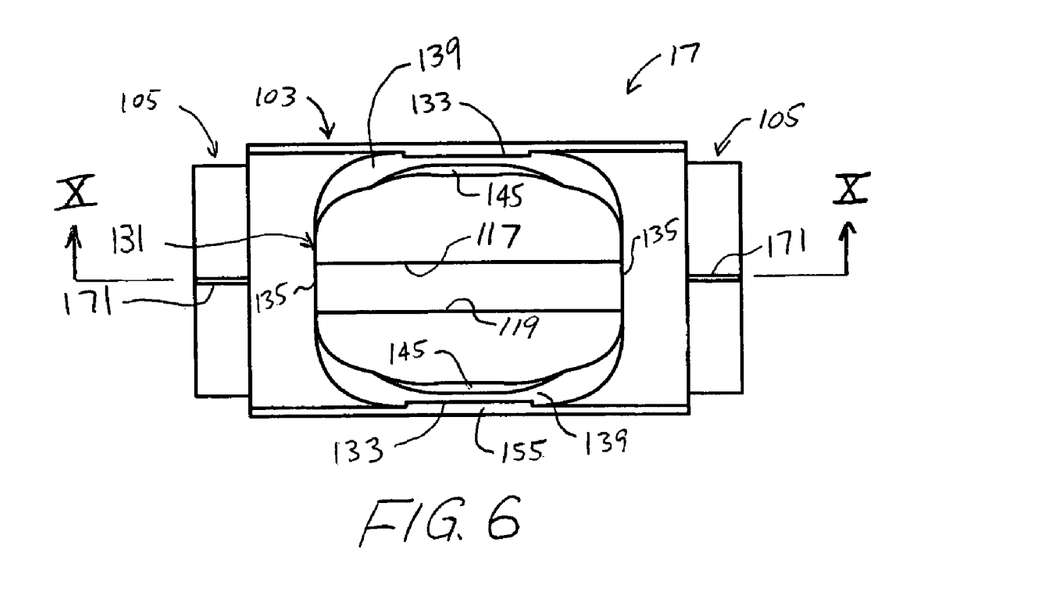
FIG. 6 illustrates a top view of the gasket of FIG. 1.
Figure 7:
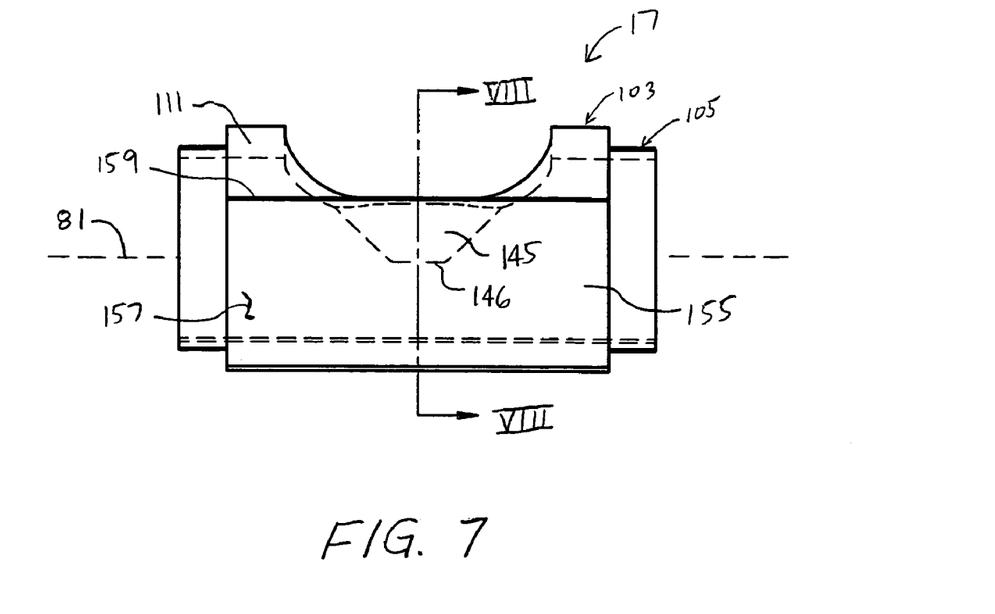
FIG. 7 depicts a side view of the gasket of FIG. 1.

As illustrated in FIG. 6, gasket outlet 131 is preferably shaped like a rounded rectangle. Alternatively, the gasket outlet 131 could be shaped similar to an ellipse, an oval, a circle, or another shape. The primary requirement is that the gasket outlet 131 be sized and shaped such that the outlet aperture 43 of the first sleeve member 13 can be positioned within the perimeter of the gasket outlet 131. In this way, the gasket 17 does not obstruct the flow of liquid or gas through the outlet aperture 43 when pipe 19 is tapped. No matter the shape or size of the gasket outlet 131, the gasket outlet 131 can still be characterized as having longitudinal and lateral surfaces 139, 141.

Figure 8:
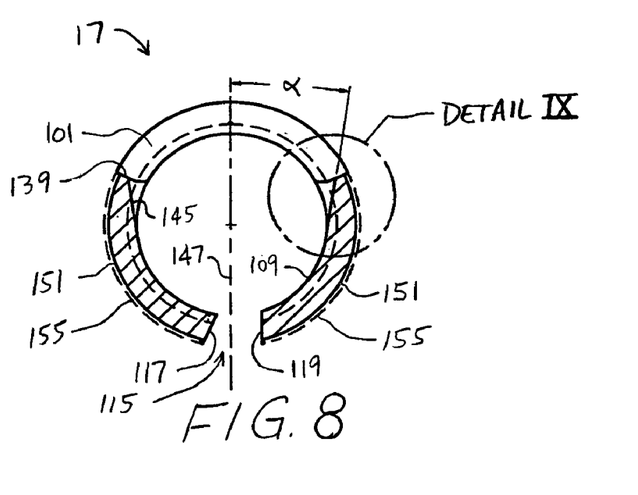
FIG. 8 illustrates a cross-sectional front view of the gasket of FIG. 7 taken at VIII—VIII.

To further prevent obstruction of the outlet aperture 43, the gasket 17 includes a pair of tapered surfaces 145. Each tapered surface 145 is positioned adjacent one of the longitudinal surfaces 139 and provides a transition between the longitudinal surfaces 139 and the inside surface 109 of the gasket 17. Referring to FIG. 8, which illustrates a cross-section at the midpoint of the gasket 17, the tapered surfaces 145 are symmetrically positioned about a gasket plane 147 (the plane is illustrated as a line since it is normal to the view shown in FIG. 8). At the midpoint of the gasket, each tapered surface 145 is positioned relative to the gasket plane 147 at an angle α of approximately 1 to 45 degrees, with a preferable range of 1 to 20 degrees. The angle α of the tapered surfaces 145 would vary depending on the size of the pipe 19 on which the gasket 17 is to be installed. Design variations in the angle α could also be affected by the thickness of the gasket wall 101. In the preferred embodiment illustrated in FIG. 8, angle α is approximately 8.7 degrees.

Figure 9:
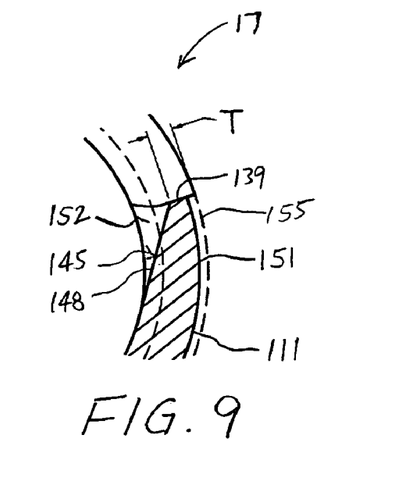
FIG. 9 depicts a cross-sectional front view of the gasket of FIG. 8 taken at Detail IX.
Figure 10:
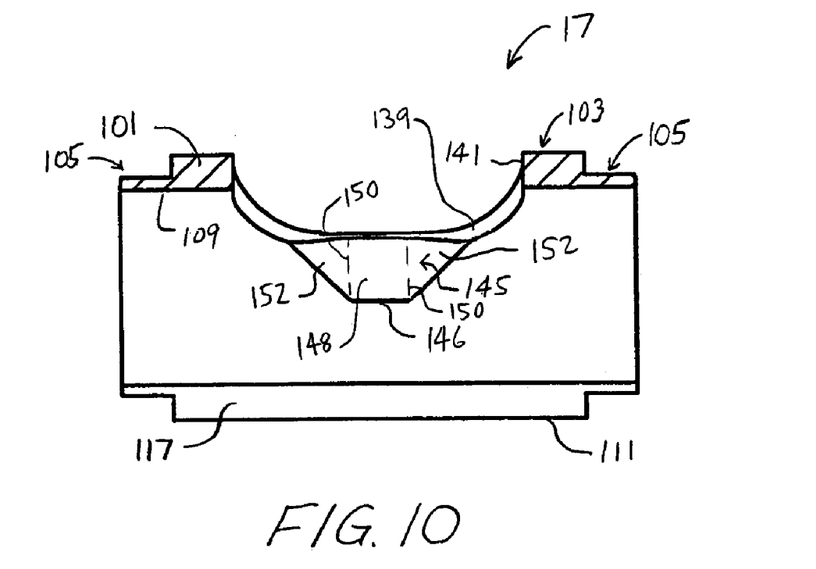
FIG. 10 illustrates a cross-sectional side view of the gasket of FIG. 6 taken at X—X.

The angle α is measured at the midpoint of the gasket. Referring to FIGS. 9 and 10, a person of ordinary skill in the art will recognize that the angle of the tapered surface 145 relative to the gasket plane 147 will likely vary at locations other than the midpoint of the gasket. As depicted in FIG. 10, each tapered surface 145 preferably covers an area that is v-shaped and includes a flat apex 146. In a planar portion 148 of the tapered surface 145 between the flat apex 146 and the longitudinal surface 139 (and schematically bounded by construction lines 150), the tapered surface 145 is substantially planar. In a non-planar portion 152, the tapered surface 145 is contoured to allow a transition between the planar portion 148 and the inside surface 109 of the gasket 17 (see also FIG. 9).

Referring still to FIG. 10, the tapered surface 145 is typically wider next to the gasket outlet 131. This is important since the tapered surface 145 helps prevent the gasket from blocking the tapped hole of the pipe 19 when the sleeve members 13, 15 are installed on the pipe 19 and gasket 17.

The exact angle, size and shape of the tapered surface could vary depending on the width of the gasket wall 101 and the size of the pipe on which the gasket is to be installed. The design parameters of the tapered surface are largely determined by empirical observation following extensive testing to determine which size and shape provides the least possibility of obstructing the tapped hole of the pipe 19. Although the thickness of the gasket could vary, it is preferred that the thickness T of the gasket along the longitudinal surface 139 at the midpoint of the gasket 17 (see FIG. 9) is less than or equal to the lip height H of the outlet retaining lip 75.

In the un-stretched, uncompressed position, first gap surface 117 is angled relative to gasket plane 147, and second gap surface 119 is parallel to gasket plane 147 (see FIG. 8). The angle chosen for first gap surface 117 is such that the two gap surfaces 117, 119 will fully engage when the sleeve members 13, 15 are placed around the gasket 17 and the gasket 17 is stretched. It is important to note that one gap surface could be angled while the other is not (as shown in FIG. 8), or both surfaces could be angled relative to the gasket plane 147. It is preferable that the two gap surfaces will meet and provide an adequate seal when the first and second sleeve members 13, 15 have been installed around the pipe 19 and the gasket 17.

The outside surface 111 of the gasket 17 includes a recess, or relief area 151 that extends between each longitudinal surface 139 and the gap 115 on both sides of the gasket 17. Preferably, the relief area 151 extends the entire length of the central portion 103 of the gasket 17. An armor member 155 is attached to the outside surface 111 of the gasket 17 in each relief area 151. Preferably, the armor members 155 are vulcanized to the gasket 17; however, the armor members 155 could be adhesively attached to the gasket 17. An outer surface 157 of each armor member is preferably flush with the outside surface 111 of the gasket when disposed in the relief area 151. Each armor member 155 includes an outlet edge 159 that is preferably immediately adjacent to the longitudinal surface 139 of the gasket outlet 131. The outlet edges 159 of the armor members 155 are adapted to be engaged by the outlet retaining lip 75 when the first and second sleeve members 13, 15 are installed around the gasket 17.

It is important to note that the outside surface 111 of the gasket 17 does not have to include relief areas 151 for accommodating the armor members 155. The armor members 155 could be attached to the outside surface 111 without using a relief area, which would create a small step between the outside surface 111 and the armor members 155 at each outlet edge 159.

An alignment mark 171 is positioned on the stepped portions 105 of the gasket wall 101 at both ends of the gasket 17. Preferably, alignment marks 171 are both aligned with the gasket plane 147. An alignment mark 175 is similarly positioned on both ends of the first sleeve member 13 (see FIG. 3).

Although the gasket 17 shown in FIGS. 5–10 is illustrated in an arcuate shape, it will be readily apparent to a person of ordinary skill in the art that the gasket wall could be relatively flat prior to installation on the pipe 19. Furthermore, while it is preferred to size gasket 17 such that it includes gap 115 when placed on pipe 19 in an un-stretched and uncompressed position, the size of the gap 115 (i.e.

distance between the gap surfaces 117, 119) could vary. In some situations the gap 115 could even be eliminated.

Figure 11:
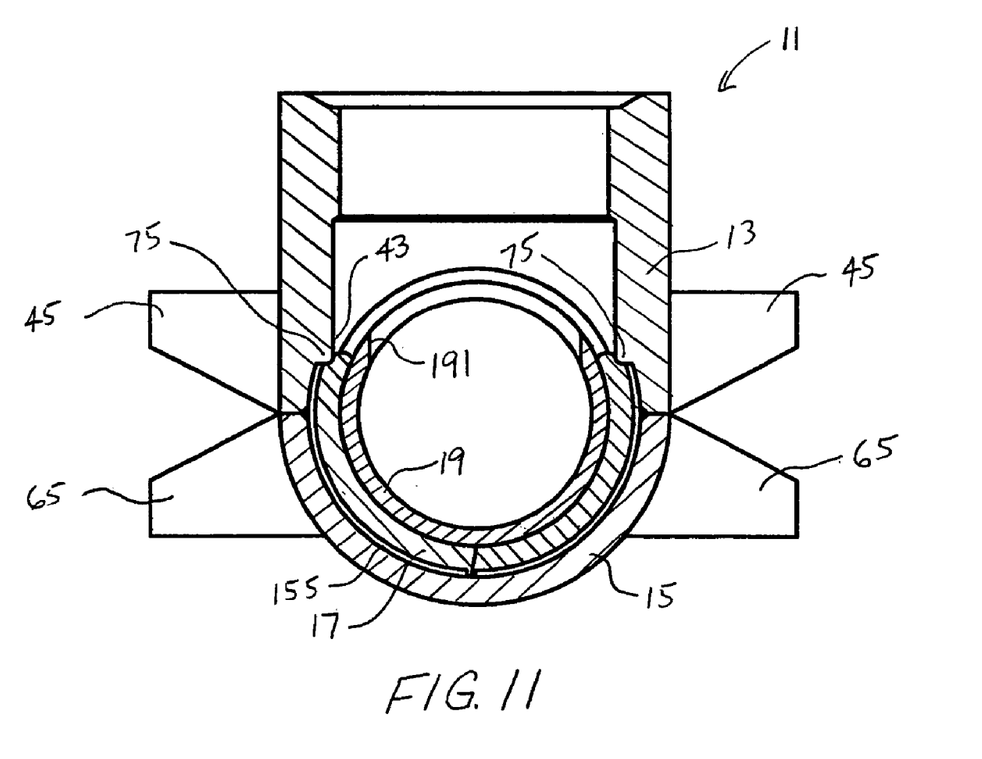
FIG. 11 depicts a cross-sectional front view of the tapping sleeve and pipe of FIG. 2 taken at XI—XI.

Referring to FIG. 11, in operation, the tapping sleeve 11 is installed on pipe 19 in order to attach a new branch line (not shown) to the pipe. Gasket 17 is positioned around pipe 19 such that the gasket outlet 131 is centered over the area of the pipe 19 where a tapped hole 191 (see FIG. 11) is to be disposed. Preferably, the gasket 17 is sized such that the gap 115 is present when the gasket 17 is placed around the pipe 19 before the first and second sleeve members 13, 15 have been installed. In this un-stretched, uncompressed position, the inside surface 109 of the gasket 19 is mated against an outside surface of the pipe 19, but the circumferential length of the gasket wall 101 is not enough to extend completely around the pipe 19 (thereby creating the gap 115).

After placing the gasket 17 on the pipe 19, the first and second sleeve members 13, 15 are placed around the gasket 17 such that the central portion 103 of the gasket falls between the end retaining lips 79 and adjacent to the inner surfaces 29, 57 of the first and second sleeve members 13, 15. The stepped portion 105 is disposed adjacent a radially inward surface 195 of the end retaining lip 79. The first sleeve member 13 is aligned with the gasket such that the alignment marks 171 on the gasket 17 are aligned with the alignment marks 175 on the first sleeve member 13. When the alignment marks 171, 175 are aligned, the outlet aperture 43 of the first sleeve member 13 is properly positioned relative to the gasket outlet 131. The first and second sleeve members 13, 15 are then aligned with one another such that fasteners 49 can be placed through the bolt holes in the first and second plurality of lugs 45, 65.

After checking the alignment of the gasket 17 and the first and second sleeve members 13, 15, the fasteners 49 are tightened to securely fasten the first sleeve member 13 to the second sleeve member 15. As the fasteners are tightened, the flat portion 85 of each outlet retaining lip 75 engages one of the outlet edges 159 of the armor members 155. Further tightening causes the flat portions 85 to exert substantially equal forces to each side of the gasket 17 through the armor members 155. As the first and second sleeve members 13, 15 move closer together, the gasket 17 is subjected to both radial compression and circumferential stretching. As the gasket wall 101 is radially compressed toward the pipe 19, the gasket elastically "flows" toward any unrestrained portion of the gasket 17. The compression, coupled with the circumferential stretching, closes the gap 115 and causes the first gap surface 117 to sealingly engage the second gap surface 119.

The radial compression also causes the gasket material to flow toward the gasket outlet 131 and the ends of the first and second sleeve members 13, 15. The outlet retaining lip 75 prevents excessive amounts of gasket material from flowing into the outlet aperture 43. The end retaining lips 79 prevents the central portion 103 of the gasket 17 from flowing past the ends of the first and second sleeve members 13, 15.

When the first mating surfaces 27 of the first sleeve member 13 engage the second mating surfaces 53 of the second sleeve member 15, the gasket is fully radially compressed against the pipe 19 and fully circumferentially stretched to close the gap 115 (see FIG. 11). As illustrated in FIG. 11, a portion of the gasket 17 flows between the outlet retaining lip 75 and the pipe 19 and may even flow past the edge of the outlet aperture 43. However, the placement of the outlet retaining lip 75 coupled with the use of the tapered surfaces 145 significantly reduces the amount of gasket material allowed to flow past the outlet retaining lip 75. This prevents the gasket 17 from blocking the tapped hole 191 when fully compressed and also prevent the portions of the gasket adjacent the gasket outlet 131 from becoming plastically deformed. It should be noted that the identification of the tapered surfaces 145 is not possible when the gasket is fully compressed (see FIG. 11). It is the tapered surfaces 145, however, that help prevent more gasket flow than that shown in FIG. 11.

FIG. 11 also depicts the benefits of armor members 151. As explained previously, the armor members 151 allow the flat portions 85 of the outlet retaining lip 75 to circumferentially stretch the gasket 17 by pushing on the outlet edges 159 of the armor members 151. Because the armor members 151 preferably fully cover the outside surface 111 of the gasket 17 between the longitudinal surfaces 139 and the gap surfaces 117, 119, the gasket 17 is prevented from "bulging" (or flowing unconstrained) between the first and second mating surfaces 27, 53 as the first and second sleeve members 13, 15 are being attached. The armor members 151 also prevent "bunching" of the gasket 17 as the gap 115 is closed. Preferably, the two armor members 151 meet when the gap 115 closes, which occurs when the first and second mating surfaces 27, 53 meet.

It is important to note that the sleeve members 13, 15 do not actually come in direct contact with the pipe 19. Even the outlet retaining lip 75 and the end retaining lips 79 are isolated from the pipe 19 by the gasket wall 101. Isolating the sleeve members 13, 15 from the pipe 15 reduces corrosion due to metal-on-metal contact and also reduces the likelihood of sparking between the metal parts. Reduced corrosion is important for any application of the tapping sleeve 11, while a reduction in the probability of sparking is especially important where the tapping sleeve is used to tap pipes carrying flammable gases or liquids.

The sizing of the gasket 17 and the sleeve members 13, 15 relative to the pipe 19 are a key feature in creating a good seal for the tapping sleeve around the pipe 19. The inner diameter of the sleeve members 13, 15 (even in the area of the end retaining lips 79) are preferably greater than the outer diameter of pipe 19. The outer diameter of the gasket 17 in the central portion 103 is greater than the inner diameter of the tapping sleeves 13, 15 between the end retaining lips 79. These sizing factors contribute to obtaining an excellent seal as the sleeve members 13, 15 are attached and the gasket 17 is compressed within the annular depression 191. By properly sizing the gap 115, full surface contact of the gasket 17 around the outside of the pipe 19 is insured.

Following the installation of the gasket 17 and sleeve members 13, 15 around pipe 19, a hole is tapped in pipe 19 and a branch line is attached to the branch portion 23 of the first sleeve member 13. This tapping operation and connection of the branch line are not explained here, since these operations are known to those of ordinary skill in the art.

The tapping sleeve of the present invention has applications with many different sizes and types of pipes, including but not limited to carbon steel pipes, ductile iron pipes, and polyvinyl chloride (PVC) pipes. Preferably, the sleeve members are cast from either ductile iron or carbon steel, but the sleeve members could also be made from stainless steel, PVC or any other suitable metal or plastic. The tapping sleeve is especially suited to small diameter pipes (less than or equal to 4 inches inner diameter) because the gasket is not required to be permanently bonded to each sleeve member. The gasket 17 is preferably made from Nitrile rubber or styrene butadiene rubber (SBR), but the gasket 17 could be made from any flexible elastomer that would allow radial compression and circumferential stretching of the gasket 17. The type of material used to make the gasket 17 depends primarily on the service application (i.e. the type of fluid carried by pipe 19).

The tapping sleeve 11 of the present invention presents several advantages over existing tapping sleeves. The outlet retaining lip 75 of the first sleeve member 13 and the tapered surfaces 145 of the gasket 17 prevent excessive amounts of gasket material from flowing past the outlet retaining lip 75. The result is that no part of the tapped hole 191 in the pipe 19 is blocked or otherwise obstructed. This is very important when using the tapping sleeve 11 for size-on-size tapping of a pipe. Tapping a hole in the pipe that is almost as large as the inner diameter of the pipe places the edge of the tapped hole 191 very close to the outlet aperture 43. It is therefore preferable to minimize the amount of gasket material that flows past the outlet aperture 43.

Another advantage of the invention is that the unitary gasket provides excellent sealing for the new branch line installed on the pipe. The placement of a properly sized gap in the wall of the unitary gasket insures that the gasket will fully contact the outer surface of the pipe after the gasket is circumferentially stretched around the pipe. Since the gasket's outer diameter is greater than the inner diameter of the sleeve members, radial compression of the gasket occurs which increases the sealing ability of the gasket. Improved sealing properties are also provided by the existence of the annular depression, which constrains the gasket 17 and helps direct compression on the gasket 17 toward the pipe 19.

Still another advantage of the present invention is the use of armor members, especially when used in conjunction with flat portions on the outlet retaining lip. The flat portions engage the armor members and exert substantially equal forces on the them, thereby stretching the gasket and closing the gap on the gasket. The equal forces applied to the armor members also ensure that the gasket does not shift or become unaligned during the installation of the sleeve members.

Yet another advantage is the elongated nature of the gasket outlet. The outlet retaining lip and the tapered surfaces help prevent excessive gasket flow on the longitudinal sides of the gasket outlet. In order to prevent excessive flow (i.e. under the outlet retaining lip) on the lateral sides of the gasket outlet, the gasket outlet is slightly elongated so that the lateral surfaces of the gasket outlet are farther away from the outlet aperture.

It should be apparent from the foregoing specification that an invention having significant advantages has been provided. While the invention is shown in only a few of its forms, it is not just limited but is susceptible to various changes and modifications without departing from the spirit thereof.

What is claimed is:

1. A tapping sleeve comprising:
   first and second sleeve members, the first sleeve member having an outlet aperture; and
   a gasket having a gasket outlet, the gasket outlet having a pair of tapered surfaces on opposing longitudinal sides of the gasket outlet and forming a pair of spaced apart longitudinal surfaces and a pair of spaced apart lateral surfaces in the gasket, each longitudinal surface being joined at one end to one of the lateral surfaces, and each longitudinal surface being adjacent to one of the tapered surfaces, wherein at least a portion of the tapered surfaces of the gasket are adapted to be compressed against a surface of a pipe disposed between the first and second sleeve members.

2. A tapping sleeve according to claim 1, wherein the gasket is a unitary gasket formed by a gasket wall that subtends an arc less than 360 degrees when placed on a pipe in an un-stretched, uncompressed position, thereby forming a gap in the gasket wall.

3. A tapping sleeve according to claim 1, wherein:
   the first sleeve member is formed from a first sleeve wall having inner and outer surfaces;
   the second sleeve member is formed from a second sleeve wall having inner and outer surfaces;
   an outlet retaining lip is disposed on the inner surface of the first sleeve member surrounding the outlet aperture, the outlet retaining lip having a lip height from the inner surface of the first sleeve member at a midpoint of the tapping sleeve; and
   the thickness of the gasket along each longitudinal surface at the midpoint of the tapping sleeve is less than or equal to the lip height of the outlet retaining lip.

4. A tapping sleeve according to claim 1, wherein:
   the first sleeve member is formed from a first sleeve wall having inner and outer surfaces;
   the second sleeve member is formed from a second sleeve wall having inner and outer surfaces;
   the tapered surfaces are symmetrically disposed about a gasket plane; and
   at a midpoint of the tapping sleeve, each tapered surface forms an angle of about 1 to 20 degrees with the gasket plane.

5. A tapping sleeve according to claim 1, wherein:
   the gasket includes a gasket wall having a central portion, a stepped portion, an inside surface, and an outside surface;
   each tapered surface provides a transition between one of the longitudinal surfaces and the inside surface of the gasket.

6. A tapping sleeve according to claim 1 further comprising:
   an outlet retaining lip disposed on an inner surface of the first sleeve member surrounding the outlet aperture;
   an end retaining lip disposed on the inner surface of the first sleeve member and on an inner surface of the second sleeve member at both ends of the first and second sleeve members;
   an annular depression formed by the end retaining lips, the outlet retaining lip, and the inner surfaces of the first and second sleeve members; and
   wherein the gasket is capable of being positioned within the annular depression.

7. A tapping sleeve comprising:
   first and second sleeve members, the first sleeve member having an outlet aperture; and
   a gasket having a gasket outlet, the gasket outlet having a pair of tapered surfaces on opposing longitudinal sides of the gasket outlet, wherein:
   the gasket is formed from a gasket wall having an inside surface and an outside surface;
   the gasket outlet forms a pair of spaced apart longitudinal surfaces and a pair of spaced apart lateral surfaces in the gasket wall, each longitudinal surface being joined at one end to one of the lateral surfaces, and each longitudinal surface being adjacent to one of the tapered surfaces; and
   each tapered surface provides a transition between one of the longitudinal surfaces and the inside surface of the gasket.

8. A tapping sleeve comprising:
first and second sleeve members, the first sleeve member having an outlet aperture;
an outlet retaining lip disposed around the outlet aperture;
a gasket having a gasket wall, the gasket waif having an inside surface, an outside surface, and a gasket outlet, the gasket wall subtending an arc less than 360 degrees when placed on a pipe in an un-stretched, uncompressed position, thereby forming a gap in the gasket wall;
an armor member attached to the outside surface of the gasket between the gasket outlet and the gap; and
wherein the outlet retaining lip is capable of engaging the armor member and, as the first and second sleeve members are connected, is capable of exerting a force on the armor member to stretch the gasket and close the gap.

9. A tapping sleeve according to claim 8, wherein:
the tapping sleeve includes a pair of armor members and each armor member is attached to the outside surface of the gasket in one of a pair of relief areas, each relief area disposed between the gasket outlet and the gap;
the outlet retaining lip includes a pair of flat portions, each flat portion being located on portions of the outlet retaining lip closest to a mating surface of the first sleeve member;
each of the flat portions is capable of engaging an edge of one of the armor members nearest the gasket outlet; and
as the first and second sleeve members are connected, the flat portions exert substantially equal forces on opposing sides of the gasket through the armor members thereby stretching the gasket around a pipe and closing the gap.

10. A tapping sleeve according to claim 8, wherein:
the gasket outlet forms a pair of spaced apart longitudinal surfaces and a pair of spaced apart lateral surfaces in the gasket wall, each longitudinal surface being joined at one end to one of the lateral surfaces, and each longitudinal surface being adjacent to one of a pair of tapered surfaces;
the tapping sleeve includes a pair of armor members and each armor member is attached to the outside surface of the gasket in one of a pair of relief areas, each relief area disposed between one of the longitudinal surfaces and the gap;
the outlet retaining lip includes a pair of flat portions, each flat portion being located on portions of the outlet retaining lip closest to a mating surface of the first sleeve member;
each of the flat portions is capable of engaging an edge of one of the armor members nearest the longitudinal surface; and
as the first and second sleeve members are connected, the flat portions exert substantially equal forces on opposing sides of the gasket through the armor members, thereby stretching the gasket around a pipe and closing the gap.

11. A tapping sleeve according to claim 8, wherein the outlet retaining lip includes a flat portion.

12. A tapping sleeve according to claim 11, wherein the armor member extends from the gasket outlet to the gap.

13. A tapping sleeve according to claim 11 further comprising:
an end retaining lip disposed on inner surfaces of the first and second sleeve members at born ends of the first and second sleeve members;
an annular depression formed by the end retaining lips, the outlet retaining lip, and the inner surfaces of the first and second sleeve members; and
wherein the gasket is capable of being positioned within the annular depression.

14. A tapping sleeve according to claim 11, wherein:
the gasket outlet further includes a pair of tapered surfaces on opposing longitudinal sides of the gasket outlet; and
the tapered surfaces prevent excessive flow of the gasket into the outlet aperture as the first and second sleeve members are connected around the gasket.

15. A tapping sleeve according to claim 11, wherein:
the gasket outlet forms a pair of spaced apart longitudinal surfaces and a pair of spaced apart lateral surfaces in the gasket wall, each longitudinal surface being joined at one end to one of the lateral surfaces, and each longitudinal surface being adjacent to one of a pair of tapered surfaces;
each tapered surface provides a transition between one of the longitudinal surfaces and the inside surface of the gasket; and
the tapered surfaces prevent excessive flow of the gasket into the outlet aperture as the first and second sleeve members are connected around the gasket.

16. A tapping sleeve according to claim 11, wherein:
the gasket outlet forms a pair of spaced apart longitudinal surfaces and a pair of spaced apart lateral surfaces in the gasket wall, each longitudinal surface being joined at one end to one of the lateral surfaces, and each longitudinal surface being adjacent to one of a pair of tapered surfaces;
the tapered surfaces are symmetrically disposed about a gasket plane; and
at a midpoint of the tapping sleeve, each tapered surface forms an angle of about 1 to 20 degrees with the gasket plane.

17. A tapping sleeve according to claim 11, wherein:
the first sleeve member is formed from a first sleeve wall having inner and outer surfaces;
the second sleeve member is formed from a second sleeve wall having inner and outer surfaces;
the outlet retaining lip has a lip height from the inner surfaces of the first and second sleeve walls at a midpoint of the tapping sleeve;
the gasket outlet forms a pair of spaced apart longitudinal surfaces and a pair of spaced apart lateral surfaces in the gasket wall, each longitudinal surface being joined at one end to one of the lateral surfaces, and each longitudinal surface being adjacent to one of a pair of tapered surfaces; and
the thickness of the gasket along each longitudinal surface at the midpoint of the tapping sleeve is less than or equal to the lip height of the outlet retaining lip.

18. A tapping sleeve according to claim 11, wherein:
the gasket wall includes a central portion and a stepped portion;
the gasket outlet is formed in the central portion and includes a pair of spaced apart longitudinal surfaces and a pair of spaced apart lateral surfaces in the gasket wall, each longitudinal surface being joined at one end to one of the lateral surfaces, and each longitudinal surface being adjacent to one of a pair of tapered surfaces;
each tapered surface provides a transition between one of the longitudinal surfaces and the inside surface of the gasket; and the tapered surfaces prevent excessive flow of the gasket into the outlet aperture as the first and second sleeve members are connected around the gasket.

19. A tapping sleeve comprising:
first and second sleeve members having inner and outer surfaces, the first sleeve member having an outlet aperture;
an outlet retaining lip disposed on the inner surface around the outlet aperture, a portion of an engagement surface of the outlet retaining lip disposed in parallel with a longitudinal axis of the outlet aperture;
an end retaining lip disposed on the inner surfaces of the first and second sleeve members at both ends of the first end second sleeve members;
a substantially continuous annular depression formed by the end retaining lips, the outlet retaining lip, and the inner surfaces of the first and second sleeve members;
a unitary gasket having a gasket wall, an inside surface, an outside surface, and a gasket outlet; and
wherein the unitary gasket is positionable within the annular depression adapted to longitudinally contact a portion of a surface of a pipe received by at least one of the first and second sleeve members.

20. A tapping sleeve according to claim 19, wherein the gasket wall subtends an arc less than 360 degrees when placed on a pipe in an un-stretched, uncompressed position, thereby forming a gap in the gasket wall.

21. A tapping sleeve according to claim 19, wherein:
the gasket wall includes a central portion and a stepped portion; and
the central portion of the gasket is positionable within the annular depression and the stepped portion is positionable adjacent a radially inward surface of the end retaining lip.

22. A tapping sleeve according to claim 19, wherein:
the gasket is placeable around a pipe such that the inside surface of the gasket is adjacent the pipe and the gasket outlet is aligned with an area of the pipe to be tapped; and
the first and second sleeve members are placeable around the gasket and the pipe such that the inner surfaces of the first and second sleeve members are adjacent the outside surface of the gasket.

23. A tapping sleeve according to claim 19, wherein:
the gasket outlet forms a pair of spaced apart longitudinal surfaces and a pair of spaced apart lateral surfaces in the gasket wall, each longitudinal surface being joined at one end to one of the lateral surfaces, and each longitudinal surface being adjacent to one of a pair of tapered surfaces;
each tapered surface provides a transition between one of the longitudinal surfaces and the inside surface of the gasket; and
the tapered surfaces prevent excessive flow of the gasket into the outlet aperture as the first and second sleeve members are connected around the gasket.

24. A tapping sleeve according to claim 19, wherein:
the outlet retaining up has a lip height at a midpoint of the tapping sleeve;
the gasket outlet forms a pair of spaced apart longitudinal surfaces and a pair of spaced apart lateral surfaces in the gasket wall, each longitudinal surface being joined at one end to one of the lateral surfaces, and each longitudinal surface being adjacent to one of a pair of tapered surfaces; and
the thickness of the gasket along each longitudinal surface at the midpoint of the tapping sleeve is less than or equal to the lip height of the outlet retaining lip.

25. A tapping sleeve according to claim 19, wherein:
the gasket outlet forms a pair of spaced apart longitudinal surfaces and a pair of spaced apart lateral surfaces in the gasket wall, each longitudinal surface being joined at one end to one of the lateral surfaces, and each longitudinal surface being adjacent to one of a pair of tapered surfaces;
the tapered surfaces are symmetrically disposed about a gasket plane; and
at a midpoint of the tapping sleeve, each tapered surface forms an angle of bout 1 to 20 degrees with the gasket plane.

26. A tapping sleeve according to claim 19, wherein:
the gasket wall includes a central portion and a stepped portion;
the central portion of the gasket is positionable within the annular depression and the stepped portion is positionable adjacent a radially inward surface of the end retaining lip;
the gasket outlet is formed in the central portion and includes a pair of spaced apart longitudinal surfaces and a pair of spaced apart lateral surfaces in the gasket wall, each longitudinal surface being joined at one end to one of the lateral surfaces, and each longitudinal surface being adjacent to one of a pair of tapered surfaces;
each tapered surface provides a transition between one of the longitudinal surfaces and the inside surface of the gasket; and
the tapered surfaces prevent excessive flow of the gasket into the outlet aperture as the first and second sleeve members are connected around the gasket.

27. A tapping sleeve comprising:
a first sleeve member having a mainline portion, a branch portion, and a first plurality of lugs integrally attached to the mainline portion, the mainline portion being formed from a first sleeve wall having an inner surface and an outer surface and terminating in a pair of first mating surfaces, the branch portion including a cylindrical passage passing through the first wall and forming an outlet aperture;
a second sleeve member having a second plurality of lugs; the second sleeve member being formed from a second sleeve wall having an inner surface and an outer surface and terminating in a pair of second mating surfaces;
an outlet retaining lip disposed on the inner surface of the first sleeve wall surrounding the outlet aperture, the outlet retaining lip having a pair of flat portions disposed on opposite sides of the outlet aperture nearest the first mating surfaces;
an end retaining lip disposed on the inner surfaces of the first and second sleeve members at both ends of the first and second sleeve members;
a unitary gasket having a central portion and a stepped portion formed from a gasket wall, the gasket wall having an inside surface and an outside surface and subtending an arc that is less than 360 degrees when placed on a pipe in an un-stretched, uncompressed position, thereby forming a gap between a first gap surface and a second gap surface of the gasket wall;
a gasket outlet formed in the central portion of the gasket, the gasket outlet forming a pair of spaced apart longitudinal surfaces and a pair of spaced apart lateral surfaces in the gasket wall, each longitudinal surface being joined at one end to one of the lateral surfaces;

a tapered surface formed in the gasket wall adjacent each longitudinal surface, the tapered surfaces providing a transition between the longitudinal surfaces and the inside surface of the gasket;

a pair of armor members attached to the outside surface of the gasket between the longitudinal surfaces of the gasket outlet and the gap in the gasket;

wherein the gasket is placeable around the pipe such that the inside surface of the gasket is adjacent the pipe and the gasket outlet is aligned with an area of the pipe to be tapped;

wherein the first and second sleeve members are placeable around the gasket and the pipe such that the inner surfaces of the first and second sleeve members are adjacent the outside surface of the central portion of the gasket, wherein the first and second sleeve members are connectable by placing fasteners through the first and second plurality of lugs and tightening the fasteners until the first mating surfaces of the first sleeve member engage the second mating surfaces of the second sleeve member;

wherein each of the flat portions of the outlet retaining lip is capable of engaging one of the armor members and, as the first and second sleeve members are connected, is capable of exerting a force on the armor member such that the gasket is stretched around the pipe, thereby closing the gap between the first and second gap surfaces; and wherein the tapered surface of the gasket prevents excessive flaw of the gasket underneath the outlet retaining lip as the first and second sleeve members are connected, thereby preventing blockage of the outlet aperture by the gasket.

28. A tapping sleeve according to claim 27, wherein:

the outlet retaining lip has a lip height with respects to the inner surface of the first sleeve wall at a midpoint of the tapping sleeve; and the thickness of the gasket along each longitudinal surface at the midpoint of the tapping sleeve is less than or equal to the lip height of the outlet retaining lip.

29. A tapping sleeve according to claim 27, wherein the tapered surfaces are symmetrically disposed about a gasket plane; and at a midpoint of the tapping sleeve, each tapered surface forms an angle of about 1 to 20 degrees with the gasket plane.

30. A tapping sleeve comprising:

first and second sleeve members, the first sleeve member having an outlet aperture and an outlet retaining lip disposed on an inner surface of the first sleeve member surrounding the outlet aperture; and a gasket having a gasket outlet, the gasket outlet having a pair of tapered surfaces on opposing longitudinal sides of the gasket outlet wherein at least a portion of the tapered surfaces of the gasket are adapted to be compressed against a surface of a pipe disposed between the first and second sleeve members.

* * * * *

UNITED STATES PATENT AND TRADEMARK OFFICE
CERTIFICATE OF CORRECTION

| | | |
|---|---|---|
| PATENT NO. | : 7,070,209 B2 | Page 1 of 1 |
| APPLICATION NO. | : 10/700242 | |
| DATED | : July 4, 2006 | |
| INVENTOR(S) | : Aaron Caldwell Najera Collins | |

It is certified that error appears in the above-identified patent and that said Letters Patent is hereby corrected as shown below:

Column 11, line 5, "waif" should be --wall--.

Column 11, line 66, "born" should be --both--.

Column 14, line 14, "bout" should be --about--.

Column 16, line 2, "flaw" should be --flow--.

Signed and Sealed this

Twelfth Day of December, 2006

JON W. DUDAS
*Director of the United States Patent and Trademark Office*